(12) United States Patent
Szarski et al.

(10) Patent No.: US 10,315,311 B2
(45) Date of Patent: Jun. 11, 2019

(54) ROBOTS, ROBOTIC SYSTEMS, AND RELATED METHODS

(71) Applicant: The Boeing Company, Chicago, IL (US)

(72) Inventors: Martin A. Szarski, Canterbury (AU); David Michael Bain, Ashburton (AU)

(73) Assignee: The Boeing Company, Chicago, IL (US)

( * ) Notice: Subject to any disclaimer, the term of this patent is extended or adjusted under 35 U.S.C. 154(b) by 387 days.

(21) Appl. No.: 15/077,199

(22) Filed: Mar. 22, 2016

(65) Prior Publication Data

US 2017/0275026 A1    Sep. 28, 2017

(51) Int. Cl.
 *B25J 9/16*    (2006.01)
 *B25J 9/00*    (2006.01)
 (Continued)

(52) U.S. Cl.
 CPC ............. *B25J 9/1687* (2013.01); *B25J 9/003* (2013.01); *B25J 9/0084* (2013.01);
 (Continued)

(58) Field of Classification Search
 CPC ...... B25J 9/1687; B25J 9/003; B25J 11/0055; B25J 9/0084; G05B 19/41815; Y10S 901/41; Y10S 901/01; Y02P 90/02
 See application file for complete search history.

(56) References Cited

U.S. PATENT DOCUMENTS 7,967,354 B2 * 6/2011 Faulkner ................ B25J 9/0093
 294/103.1
9,358,646 B2 * 6/2016 Valasek ................ B25J 15/0061
 (Continued)

FOREIGN PATENT DOCUMENTS

CN    201808063    4/2011
CN    102357882    2/2012
 (Continued)

OTHER PUBLICATIONS

Umar Asif, "*Design of a Parallel Robot with a Large Workspace for the Functional Evaluation of Aircraft Dynamics beyond the Nominal Flight Envelope*," International Journal of Advanced Robotic Systems, vol. 9, 51, 2012.
 (Continued)

*Primary Examiner* — Jason Holloway
(74) *Attorney, Agent, or Firm* — DASCENZO Intellectual Property Law, P.C.

(57) ABSTRACT

Robots for moving relative to a surface, robotic systems including the same, and associated methods are disclosed. A robot includes a body, at least two legs, and at least two feet. Each leg has a proximal end region operatively coupled to the body at a respective body joint with one rotational degree of freedom and a distal end region operatively coupled to a respective foot at a respective foot joint comprising two rotational degrees of freedom. Each foot is configured to be translated relative to the surface with two degrees of translational freedom. Robotic systems include one or more robots and a surface along which the one or more robots are positioned to move. Methods of operating robots and of operating robotic systems include translating at least one foot of a robot to operatively move the body of the robot with six degrees of freedom.

18 Claims, 8 Drawing Sheets

(51) Int. Cl.
*B25J 11/00* (2006.01)
*G05B 19/418* (2006.01)

(52) U.S. Cl.
CPC ..... *B25J 11/0055* (2013.01); *G05B 19/41815* (2013.01); *Y02P 90/02* (2015.11); *Y10S 901/01* (2013.01); *Y10S 901/41* (2013.01)

(56) References Cited

U.S. PATENT DOCUMENTS

| | | | | |
|---|---|---|---|---|
| 2004/0146388 | A1* | 7/2004 | Khajepour | B25J 17/0266 414/680 |
| 2007/0248428 | A1* | 10/2007 | Ota | B23Q 1/4857 409/201 |
| 2008/0294285 | A1* | 11/2008 | Shoham | B25J 9/1623 700/245 |
| 2009/0183550 | A1* | 7/2009 | Valasek | B25J 9/1623 73/1.79 |
| 2009/0279999 | A1* | 11/2009 | Faulkner | B25J 9/0093 414/800 |
| 2013/0061710 | A1* | 3/2013 | Long | B25J 17/0216 74/490.05 |
| 2013/0142608 | A1* | 6/2013 | Zhang | B25J 9/0051 414/729 |
| 2014/0060230 | A1* | 3/2014 | Nagayama | B25J 18/02 74/490.01 |
| 2014/0096636 | A1* | 4/2014 | Hirano | F16C 3/035 74/490.01 |
| 2015/0367516 | A1* | 12/2015 | Sarh | B25J 9/1697 700/259 |

FOREIGN PATENT DOCUMENTS

| | | | | |
|---|---|---|---|---|
| CN | 202448137 | | 9/2012 | |
| DE | 19920776 | | 11/1999 | |
| DE | 102015216272 | A1 * | 3/2017 | ................ B25J 9/08 |

OTHER PUBLICATIONS

English abstract of foreign language reference DE 19920776, downloaded from espacenet.com on Feb. 23, 2016.
English abstract of foreign language reference CN 201808063, downloaded from espacenet.com on Dec. 3, 2015.
English abstract of foreign language reference CN 102357882, downloaded from espacenet.com on Dec. 3, 2015.
English abstract of foreign language reference CN 202448137, downloaded from espacenet.com on Dec. 3, 2015.

* cited by examiner

ROBOTS, ROBOTIC SYSTEMS, AND RELATED METHODS

FIELD

The present disclosure relates to robots, robotic systems, and related methods.

BACKGROUND

Modern automated manufacturing facilities commonly utilize kinematic robots to transport, manipulate, and/or assemble work pieces and/or components thereof. Such a robot may be characterized by a number of degrees of freedom (DOF) through which a component of the robot may be moved. For example, a 6 degree of freedom (6 DOF) robot may be capable of moving an end effector mounted on the robot through three translational degrees of freedom (e.g., X, Y, and Z) as well as through three rotational degrees of freedom (e.g., roll, pitch, and yaw). In addition, a robot may be characterized by a work envelope that describes a set of all locations and orientations accessible by the robot. It is generally desirable that a kinematic robot be capable of achieving full 6 DOF motion over a large work envelope while limiting the total size and/or footprint of the robot.

Serial robots generally include a plurality of independently controllable link elements connected in series. While serial robots may allow for motion with up to 6 DOF as well as a large work envelope, their speed and precision are limited. In particular, as a consequence of mounting the link elements in series, the errors of the individual links are compounded, requiring large link elements with extremely fine calibration to achieve end effector accuracy. Consequently, the large mass of the link elements limits the speed with which the serial robot may be manipulated.

Alternatively, parallel robots generally include a plurality of independently controllable link elements connected in parallel, such that the errors of each link element are averaged rather than compounded. However, current designs for parallel robots generally require a large footprint relative to their work envelope and/or achieve full 6 DOF motion only when they include heavy wrist elements added in series with the parallel link elements.

SUMMARY

Parallel kinematic robots for moving relative to a surface, robotic systems including the same, and associated methods are disclosed.

A robot includes a body, at least two legs, and at least two feet. Each leg of the at least two legs has a proximal end region and a distal end region, wherein the proximal end region of each leg is operatively coupled to the body at a respective body joint with one rotational degree of freedom. Each foot of the at least two feet is operatively coupled to the distal end region of a respective leg of the at least two legs at a respective foot joint comprising two rotational degrees of freedom. Each foot is configured to be selectively, independently, and motively translated relative to the surface with two degrees of translational freedom. A method of operating a robot includes selectively, independently, and motively translating at least one foot of the at least two feet of the robot to operatively move the body of the robot with six degrees of freedom.

A robotic system includes one or more robots and a surface along which the one or more robots are positioned to move. A method of operating a robotic system includes selectively, independently, and motively translating at least one foot of the one or more robots to operatively move the respective bodies with six degrees of freedom.

DESCRIPTION

Parallel kinematic robots for moving relative to a surface, robotic systems including the same, and associated methods are disclosed. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

Figure 1:
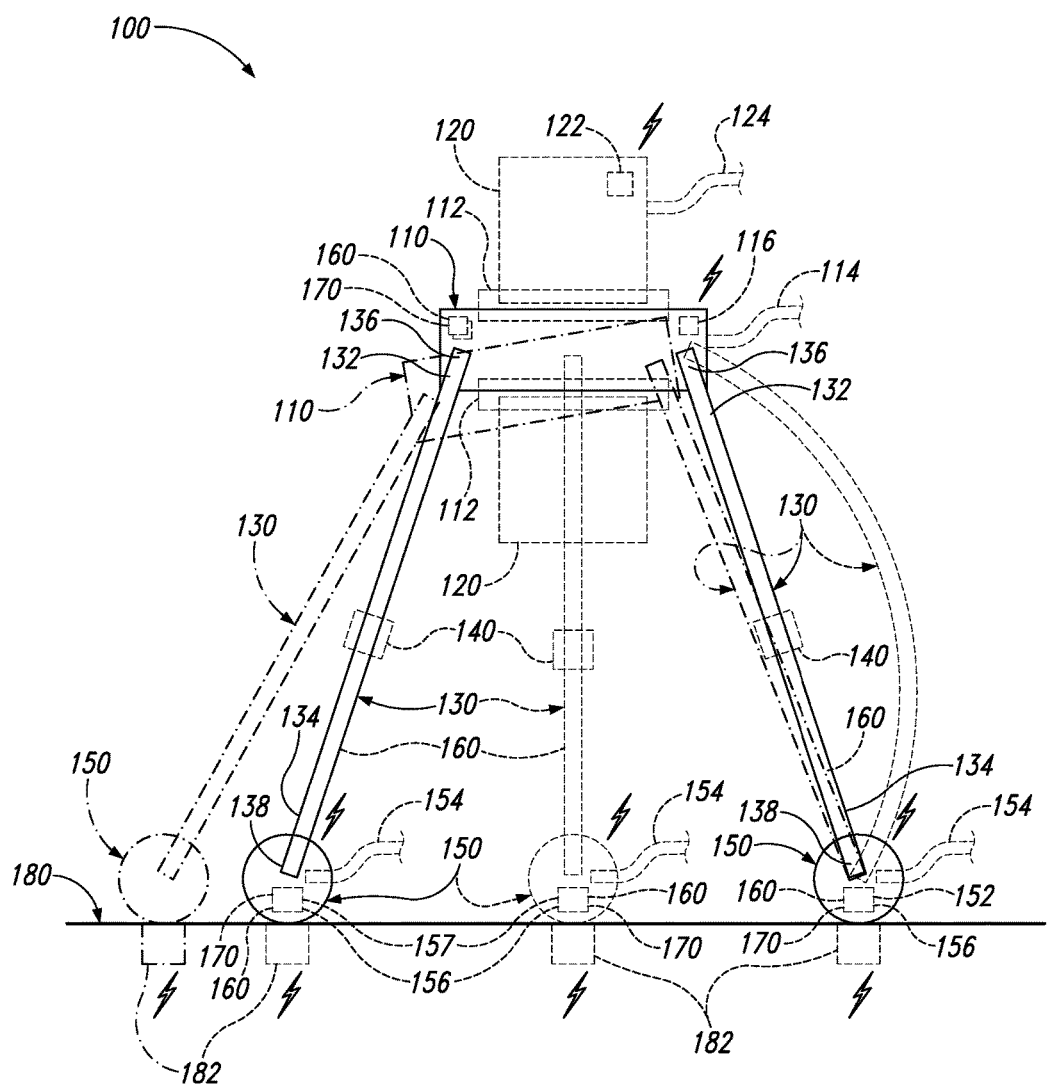
FIG. 1 is a schematic illustration representing robots according to the present disclosure.

As schematically illustrated in FIG. 1, a robot 100 for moving relative to a surface 180 includes a body 110, at least two legs 130, and at least two feet 150. Each leg 130 has a proximal end region 132 and a distal end region 134, wherein the proximal end region of the leg is operatively coupled to body 110 at a respective body joint 136 with one rotational degree of freedom. Each foot 150 is operatively coupled to distal end region 134 of a respective leg 130 at a respective foot joint 138 comprising two rotational degrees of freedom. Each foot 150 is configured to be selectively, independently, and motively translated relative to surface 180 with two degrees of translational freedom. In this way, robot 100 may be configured to bring body 110 to a predetermined position and/or rotational orientation with six degrees of freedom by selectively positioning each foot 150 with respect to each other foot 150 and with respect to surface 180. Stated differently, robot 100 may be configured such that a location and/or positional orientation of body 110 may be determined based on relative positions of the feet 150 on surface 180.

As used herein, the terms "selective" and "selectively," when modifying an action, movement, configuration, or other activity of one or more components or characteristics of an apparatus, mean that the specific action, movement, configuration, or other activity is a direct or indirect result of an input configured to manipulate an aspect of, or one or more components of, the apparatus.

Body 110 may be configured to be operatively coupled to an end effector 120. Specifically, body 110 may include one or more coupling structures 112 configured to couple an end effector 120 to body 110. For example, coupling structure 112 may include a mechanical linkage such as a bolt platter configured to receive one or more bolts; however, other examples of coupling structure 112 are within the scope of the present disclosure, and any suitable coupling structure 112 may be utilized.

Body 110 may be configured to be operatively coupled to end effector 120 in any suitable orientation. For example, body 110 may include a first side 111 that generally faces the legs 130 and a second side 113 that generally faces away from the legs 130, and end effector 120 may be coupled to the body 110 on the first side 111. In such a configuration, end effector 120 may be described as being positioned between, or generally between, the legs 130. Additionally or alternatively, body 110 may be configured to be operatively coupled to end effector 120 with end effector 120 coupled to the body 110 on the second side 113, such that the end effector 120 may be described as being positioned opposite, or generally opposite, the legs 130 relative to the body 110.

End effector 120 may be any suitable tool for contacting, positioning, manipulating, and/or altering a work piece. For example, end effector 120 may include a welding tool, a drilling tool, a cutting tool, a material removal tool, a fiber placement tool, a gripping tool, a force-torque sensor, a tool changer, and/or a lifting tool. End effector 120 may include an end effector controller 122 configured to selectively translate, manipulate, and/or otherwise control end effector 120 to accomplish a task.

As used herein, a "controller" may be any suitable device or devices that are configured to perform the functions of the controller discussed herein. For example, the controller may include one or more of an electronic controller, a dedicated controller, a special-purpose controller, a personal computer, a special-purpose computer, a display device, a logic device, a memory device, and/or a memory device having non-transitory computer readable media suitable for storing computer-executable instructions for implementing aspects of systems and/or methods according to the present disclosure.

Each body joint 136 may define a single rotational degree of freedom between body 110 and leg 130. For example, each body joint 136 may consist of a revolute joint such as a single-axis hinge. Body joint 136 may allow for any suitable range of rotational motion of leg 130 with respect to body 110. For example, body joint 136 may be configured to allow leg 130 to rotate with respect to body 110 through an angular range that is at least 10 degrees, at least 30 degrees, at least 45 degrees, at least 60 degrees, at least 90 degrees, at least 120 degrees, at least 180 degrees, at least 225 degrees, at least 270 degrees, less than 270 degrees, less than 230 degrees, less than 180 degrees, less than 160 degrees, less than 100 degrees, less than 75 degrees, less than 50 degrees, less than 40 degrees, and/or less than 20 degrees. In some examples, body joints 136 may be evenly spaced around a periphery of body 110. In other examples, body joints 136 may be unevenly spaced around a periphery of body 110.

Each leg 130 may include, or be, an elongate leg. For example, leg 130 may be characterized by a leg width and a leg length that is substantially larger than the leg width. Each leg 130 may have the same length, or at least substantially the same length. Each leg 130 may have a fixed length or may be configured to be selectively increased and/or decreased in length. For example, leg 130 may be a telescoping leg 130, and/or may include an extension structure 140 configured to selectively vary a length of leg 130.

Each leg 130 may be rigid, or at least substantially rigid. For example, leg 130 may be configured such that it remains at least substantially unbent under typical operating conditions. Each leg 130 may be at least substantially linear. Alternatively, at least one leg 130 may be non-linear. For example, and as schematically and optionally illustrated in FIG. 1, leg 130 may have a leg shape that includes an arcuate curve and/or a preformed angle. Such a configuration may be beneficial, for example, in an example in which robot 100 is straddling or otherwise operating proximate to a fixed object, such as a work piece and/or a surface supporting a work piece, such that legs 130 may be moved in close proximity to the fixed object without colliding with the fixed object. Additionally or alternatively, such a configuration may facilitate manipulation of a work piece by end effector 120 in an example in which the end effector 120 is coupled to the first side 111 of body 110 such that the work piece and the end effector 120 are positioned generally between legs 130.

Robot 100 may include at least three legs 130, and may include at least three feet 150. For example, and as schematically illustrated in dashed lines in FIG. 1 and in FIGS. 2-4, the at least two legs 130 may consist of three legs 130, and the at least two feet 150 may consist of three feet 150. That is, a robot 100 may include exactly three legs 130 and exactly three feet 150.

As discussed, each foot joint 138 includes at least two rotational degrees of freedom, which may permit a rotation of leg 130 with respect to foot 150 with a corresponding at least two rotational degrees of freedom. For example, foot joint 138 may be configured to permit a rotation of leg 130 with respect to foot 150 about a roll axis that is substantially parallel to a projection of leg 130 onto surface 180, about a pitch axis that is substantially perpendicular to the roll axis and substantially parallel to surface 180, and/or about a yaw axis that is substantially perpendicular to surface 180. However, this is not required, and it is within the scope of the present disclosure that the at least two rotational degrees of freedom correspond to any appropriate non-parallel rotational axes.

Foot joint 138 may include a spherical joint, a ball joint, a ball-and-socket joint, and/or a universal joint. For example, foot joint 138 may include a spherical joint, a ball joint, and/or a ball-and-socket joint that defines exactly three rotational degrees of freedom.

As discussed, each foot 150 is configured to be selectively, independently, and motively translated relative to surface 180 with two degrees of translational freedom. Foot 150 may include a surface engagement structure 152 configured to contact or otherwise engage surface 180. For example, foot 150 and/or surface engagement structure 152 may include a planar motor, such as a Sawyer motor, and foot 150 may include a forcer configured to translate foot 150 relative to surface 180. Additionally or alternatively, foot 150 and/or surface engagement structure 152 may include one or more wheels, such as spherical wheels and/or motorized wheels. Additionally or alternatively, foot 150 may include an automated guided vehicle (AGV).

Foot 150 and/or surface engagement structure 152 may include an air bearing configured to provide a cushion of air between each foot 150 and surface 180 to minimize a friction force between foot 150 and surface 180. Additionally or alternatively, surface 180 may include a foot engagement structure 182 configured to contact or otherwise engage with foot 150, and surface 180 may include an air bearing configured to provide a cushion of air between foot 150 and surface 180.

Each foot 150 may be configured to be selectively and releasably fixed to surface 180 at a respective location. For example, in an example in which foot 150 and/or surface 180 includes an air bearing configured to provide a cushion of air between foot 150 and surface 180, the cushion of air may be selectively removed, and/or a binding force such as a magnetic force may be selectively applied to fix foot 150 in place relative to surface 180. Such a functionality may be desirable, for example, to maintain body 110 in a fixed, or at least substantially fixed, location and/or rotational orientation while end effector 120 performs an operation or receives a load.

As also schematically represented in dashed lines in FIG. 1, robot 100 may include one or more sensors 160 operatively coupled to one or more of body 110, leg 130, and foot 150. Sensor 160 may be configured to detect one or more of position in three-dimensional space, orientation in three-dimensional space, and acceleration.

Robot 100 additionally may include one or more robot controllers 170 configured to selectively, independently, and motively translate each foot 150 relative to surface 180. As schematically illustrated in FIG. 1, a robot controller 170 may be positioned in any suitable location on robot 100, such as at the body 110 and/or at a foot 150. Robot controller 170 may be communicatively coupled to the sensors 160, such as via a wireless protocol, as schematically represented by lightning bolts in FIG. 1, and/or via a wired communication protocol. In such an example, robot controller 170 may be configured to selectively, independently, and motively translate each foot 150 relative to surface 180 based at least in part on data received from the sensors 160.

Additionally or alternatively, body 110 may include a body tether 114 that may be configured to provide power and/or commands to body 110, and hence may operate in place of and/or in conjunction with robot controller 170. Similarly, foot 150 may include a foot tether 154 that may be configured to provide power and/or commands to foot 150, and hence may operate in place of and/or in conjunction with robot controller 170.

Additionally or alternatively, body 110 may include a body battery 116, and/or foot 150 may include a foot battery 156, such that body battery 116 and/or foot battery 156 may be configured to provide electrical power to any suitable component of robot 100, such as body 110, end effector 120, foot 150, sensor 160, and/or robot controller 170.

As an example, in operation, robot 100 may be configured to bring end effector 120 to a predetermined position and/or rotational orientation, wherein the position and/or rotational orientation of end effector 120 may be uniquely determined by a respective position of each foot 150 relative to surface 180 and relative to one another. In such an example, sensor 160 may measure a position and/or rotational orientation of body 110 and/or end effector 120, which may be compared to a target position and/or rotational orientation, and robot controller 170 subsequently may translate one or more feet 150 to bring body 110 and end effector 120 to the target position and/or rotational orientation.

Figure 2:
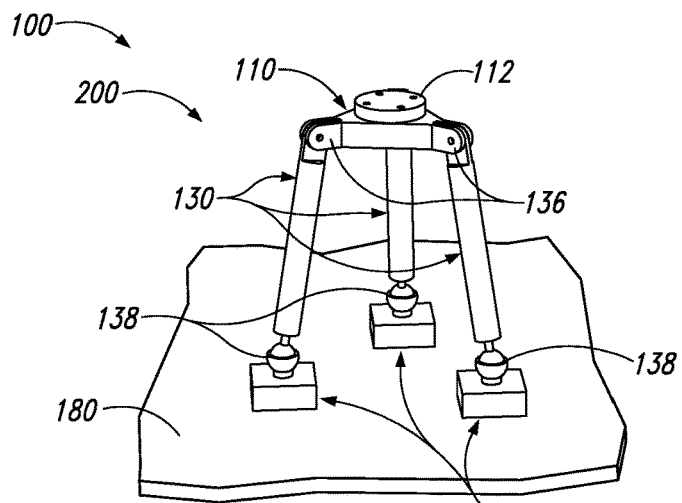
FIG. 2 is a perspective view of an example robot according to the present disclosure.
Figure 3:
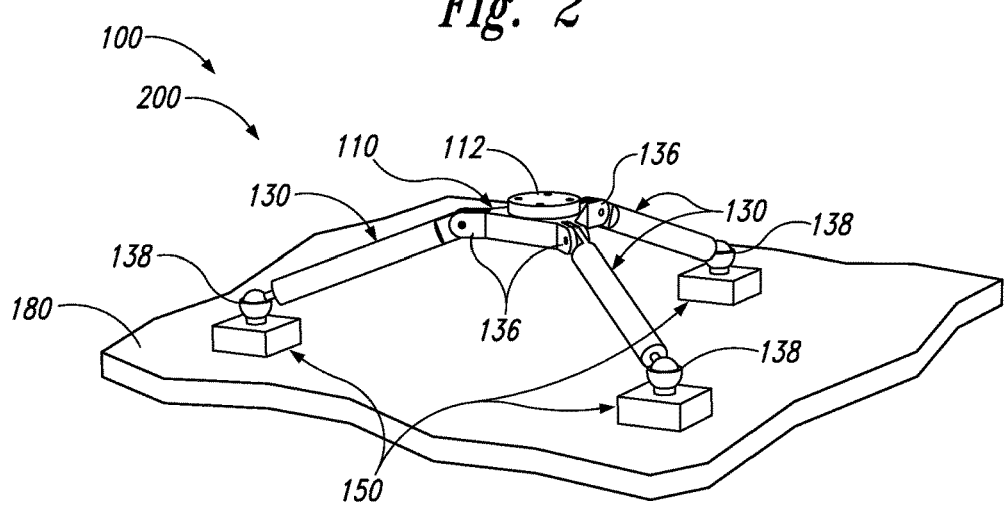
FIG. 3 is another perspective view of the example robot of FIG. 2.
Figure 4:
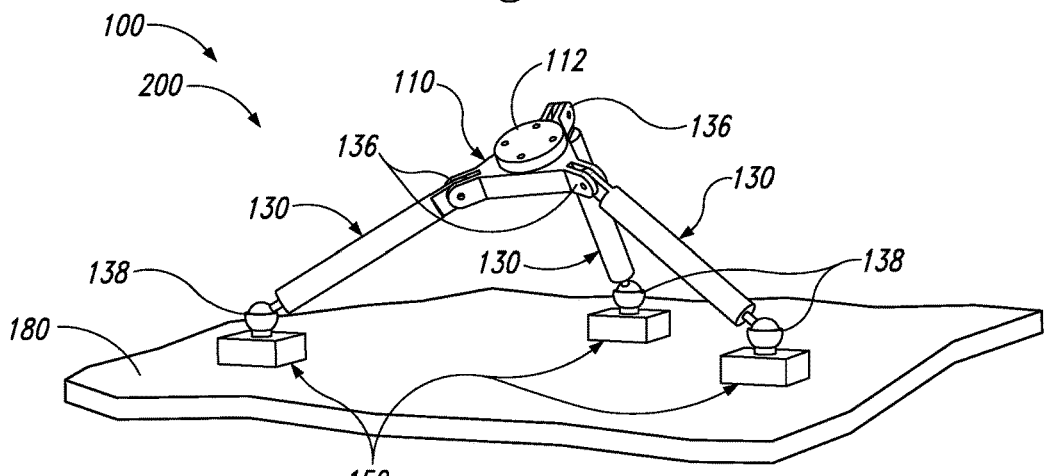
FIG. 4 is another perspective view of the example robot of FIG. 2.

Turning now to FIGS. 2-4, an illustrative, non-exclusive example of robot 100 is illustrated and indicated at 200. Where appropriate, the reference numerals from the schematic illustration of FIG. 1 are used to designate corresponding parts of the example of FIGS. 2-4; however, the example of FIGS. 2-4 is non-exclusive and does not limit robots 100 to the illustrated example of FIGS. 2-4. That is, robots 100 are not limited to the specific example of FIGS. 2-4, and robots 100 may incorporate any number of the various aspects, configurations, characteristics, properties, etc. of robots 100 that are illustrated in and discussed with reference to the schematic representation of FIG. 1 as well as variations thereof, without requiring the inclusion of all such aspects, configurations, characteristics, properties, etc. For the purpose of brevity, each previously discussed component, part, portion, aspect, region, etc. or variants thereof may not be discussed, illustrated, and/or labeled again with respect to the example of FIGS. 2-4; however, it is within the scope of the present disclosure that the previously discussed features, variants, etc. may be utilized with the example of FIGS. 2-4.

As seen in FIGS. 2-4, robot 200 is an illustrative, non-exclusive example of a robot 100 that includes a body 110, three legs 130, and three feet 150 for moving relative to a surface 180. As illustrated, body 110 includes a coupling structure 112 that includes a bolt platter into which a plurality of bolts may be inserted to selectively couple end effector 120 to body 110. Each leg 130 is substantially linear and has a fixed, common length. Each leg 130 includes a body joint 136 in the form of a single-axis hinge and includes a foot joint 138 in the form of a ball-and-socket joint with three rotational degrees of freedom. Each foot 150 includes a planar motor configured to translate foot 150 relative to surface 180 with two degrees of translational freedom.

FIGS. 2-4 additionally illustrate a plurality of locations and rotational orientations that may be assumed by body 110 based on the relative positions of feet 150. For example, with reference to FIGS. 2-3, FIG. 3 illustrates a configuration in which body 110 is brought closer to surface 180 relative to the configuration illustrated in FIG. 2 by moving each foot 150 radially outward with respect to a projection of a center point of body 110 onto surface 180. Additionally, with reference to FIGS. 2 and 4, FIG. 4 illustrates a configuration in which body 110 is maintained at a generally constant distance above surface 180 relative to the configuration illustrated in FIG. 2, but in which a rotational orientation of body 110 has been altered by altering the relative positions of feet 150.

Figure 5:
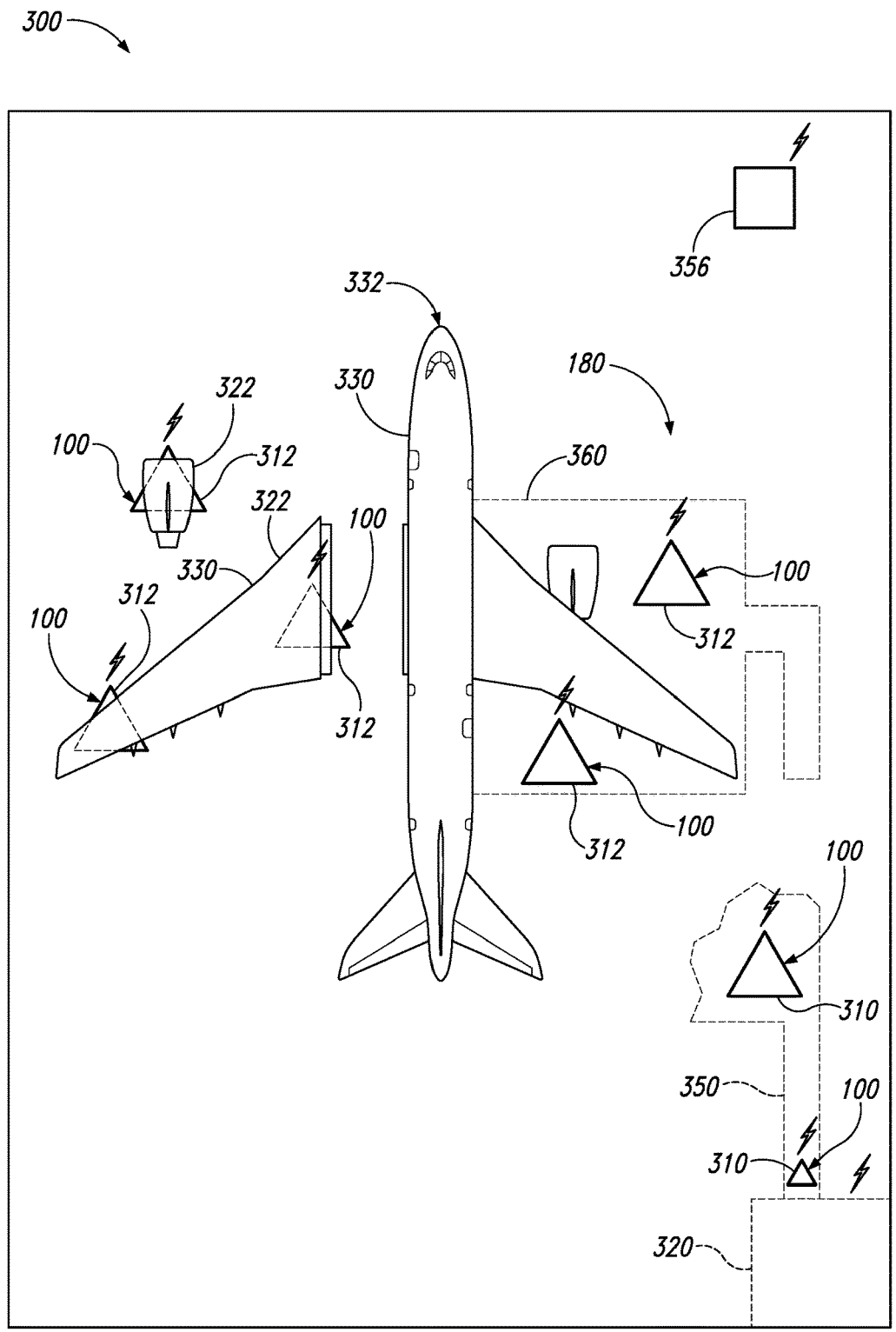
FIG. 5 is a schematic illustration representing robotic systems according to the present disclosure.
Figure 6:
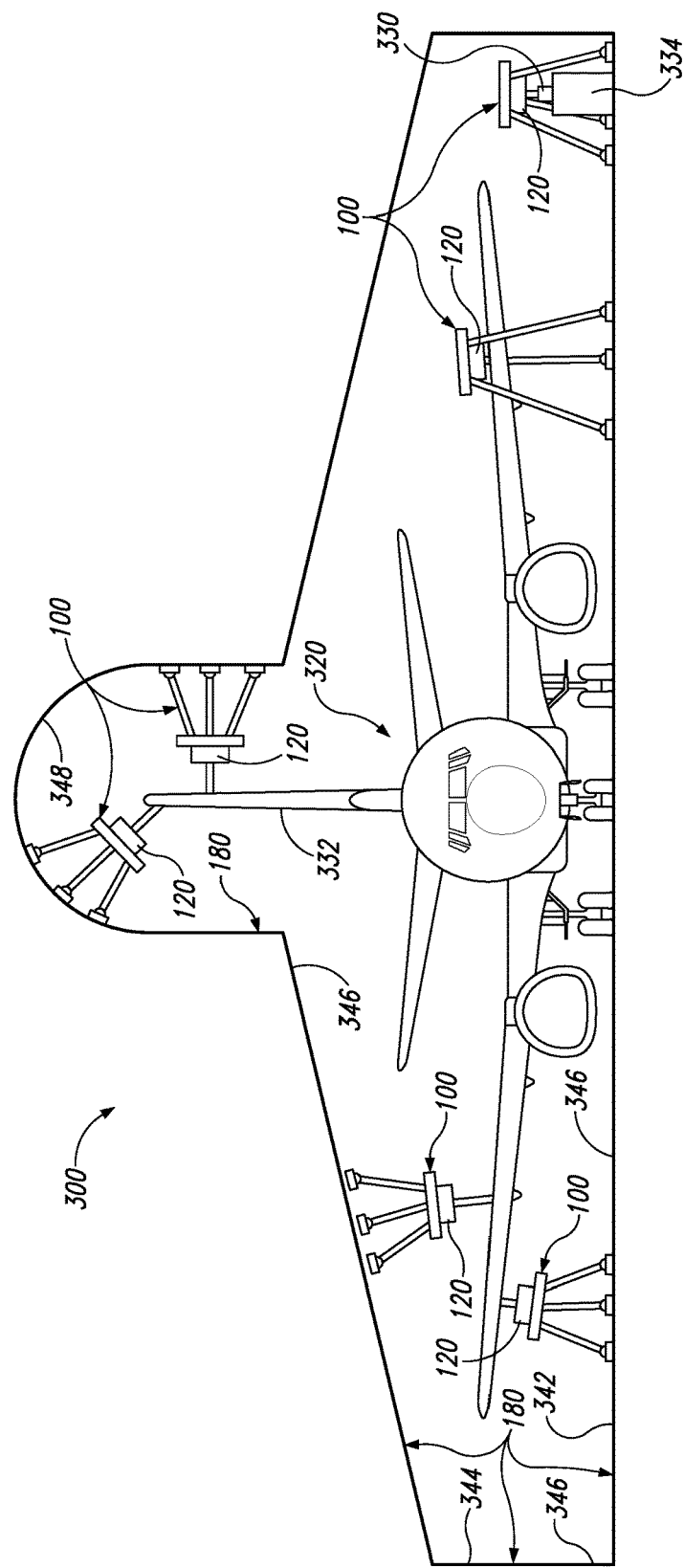
FIG. 6 is another schematic illustration representing robotic systems according to the present disclosure.

Turning now to FIGS. 5-10, illustrative, non-exclusive examples of robotic systems 300 are illustrated. A robotic system 300 includes one or more robots 100 and surface 180 such that the robots 100 are positioned for moving along surface 180. While FIGS. 5-6 illustrate robotic systems 300 utilized in the context of aircraft manufacturing, this is provided as a non-limiting example, and it is within the scope of the present disclosure that robotic systems 300 may be utilized in any appropriate application. In FIG. 5, robots 100 are schematically represented as triangles; however, this representation is for illustrative purposes only, and is not intended to be indicative of a particular form, size, or appearance of robots 100.

Robotic system 300 may include a plurality of robots 100. A given robot 100 of the plurality of robots 100 may be configured to perform a distinct task from, and/or may be sized differently from, a different robot 100 of the plurality of robots 100. For example, a given robot 100 may have a corresponding type of end effector 120 operatively coupled to its respective body 110, and a different robot 100 may have a different type of end effector 120 operatively coupled to its respective body 110. Additionally or alternatively, a given robot 100 may have a respective end effector 120 operatively coupled to its respective body 110 between its respective legs 130, while a different robot 100 may have a respective end effector 120 operatively coupled to its respective body 110 opposite its respective legs 130 relative to its body 110.

As further examples, and with reference to FIG. 5, the robots 100 of robotic system 300 may include at least one transporting robot 310 configured to selectively acquire and transport parts 322 to proximate an apparatus 330 being assembled. As used herein, apparatus 330 additionally or alternatively may be referred to as work piece 330, and work piece 330 may include, and/or be, one or more parts 322. Robotic system 300 additionally may include an inventory 320 of parts 322 for assembling apparatus 330, such that surface 180 extends proximate inventory 320 and such that the at least one transporting robot 310 is configured to selectively acquire and transport parts from inventory 320 to proximate apparatus 330.

Additionally or alternatively, the robots 100 of robotic system 300 may include at least one installing robot 312 configured to selectively receive parts 322 from the at least one transporting robot 310 for operatively installing parts 322 on apparatus 330. For example, and with continued reference to FIG. 5, apparatus 330 may include, or be, an aircraft 332 or a portion thereof, and part 322 may be any suitable component of aircraft 332, such as a wing, an engine, or a fuselage component, such that the robots 100 may be configured to support, transport, align, machine, orient, and/or install any suitable part 322. As used herein, part 322 generally may refer to any suitable component that is utilized in assembly of work piece 330 and/or that is included in an assembled work piece 330. Therefore, it is within the scope of the present disclosure that a given component may be referred to both as a part 322 as well as a work piece 330. For example, and as illustrated in FIG. 5, part 322 may take the form of an engine that is installed on a work piece 330 in the form of a wing, and/or part 322 may take the form of a wing that is installed on a work piece 330 in the form of a fuselage.

Surface 180 of robotic system 300 may include one or more travel regions 350 configured for robot 100, such as transporting robot 310, to travel along without being positioned to work on apparatus 330. Additionally or alternatively, Surface 180 of robotic system 300 may include one or more operational regions 360 configured for a robot 100, such as installing robot 312, to be positioned to work on apparatus 330. Travel region 350 may be configured for robot 100, such as transporting robot 310, to travel to and from operational region 360. As illustrated in FIG. 5, travel region 350 may be elongate. For example, travel region 350 may have a width that is not substantially greater than a width of robot 100 traveling along travel region 350 and/or that is substantially less than a dimension of an operational region 360.

As further illustrated in FIG. 5, robotic system 300 additionally may include a system controller 356 configured to selectively translate feet 150 of the robots 100 relative to surface 180. System controller 356 may be configured to coordinate movement of at least two robots 100 to accomplish a task. For example, system controller 356 may be configured to coordinate a transfer of a work piece from transporting robot 310 to installing robot 312. Additionally or alternatively, system controller 356 may be configured to monitor and coordinate the motion of one or more robots 100 such that robots 100 may accomplish independent tasks without colliding with one another or with their surroundings. System controller 356 may be configured to interface with one or more robots 100 in any suitable manner, such as via a wireless protocol, as schematically represented by lightning bolts in FIG. 5, and/or via a wired communication protocol.

Turning now to FIG. 6, additional illustrative, non-exclusive examples of robotic systems 300 are represented. As illustrated in FIG. 6, surface 180 may assume any appropriate configuration. For example, surface 180 may include one or more horizontal regions 342 and/or one or more vertical regions 344. Additionally or alternatively, surface 180 may include one or more planar regions 346 and/or one or more curved regions 348. As illustrated in FIG. 6, a planar region 346 of surface 180 may include, or be, a horizontal region 342 and/or a vertical region 344, and/or may include a region that is not substantially horizontal or vertical, such as a region that is angled with respect to a horizontal or vertical plane.

As illustrated in FIG. 6, in some examples, robot 100 may be located on surface 180 in a position that is suspended with respect to a ground surface. Stated differently, robot 100 may be positioned on surface 180 such that an attractive force may be necessary to prevent robot 100 from falling off of surface 180. Such an attractive force may be provided by any suitable mechanism, such as a magnetic force between foot 150 and surface 180, a mechanical linkage between foot 150 and surface 180, and/or a vacuum seal between foot 150 and surface 180.

In an example in which foot 150 and/or surface engagement structure 152 includes a planar motor, such as a Sawyer motor, and/or in which foot 150 includes a forcer configured to translate foot 150 relative to surface 180, surface 180 of robotic system 300 may include, or be, a platen configured for use with planar motors. In such an example, a magnetic attraction between foot 150 and surface 180 may facilitate orienting and/or maintaining robot 100 in an elevated position. Additionally or alternatively, and with reference to FIG. 5, a travel region 350 or an operational region 360 of surface 180 may include, or be, a platen configured for use with planar motors.

Additionally or alternatively, and as discussed, surface 180 of robotic system 300 may include one or more air bearings configured to provide a cushion of air between feet 150 of robot 100 and surface 180. In such an example, a selective removal of the cushion of air between feet 150 and surface 180 may provide a vacuum seal that may facilitate orienting and/or maintaining robot 100 in an elevated position.

As further illustrated in FIG. 6, end effector 120 of a robot 100 of robotic system 300 may assume any appropriate orientation with respect to body 110, legs 130, surface 180, and/or apparatus 330. For example, and as discussed, end effector 120 may be positioned opposite legs 130 relative to body 110, such that robot 100 may be substantially entirely between surface 180 and apparatus 330 when robot 100 is manipulating apparatus 330. Alternatively, and as discussed, end effector 120 may be positioned between legs 130, such that apparatus 330 may be positioned substantially between body 110 of robot 100 and surface 180 when robot 100 is manipulating apparatus 330. In such a configuration, apparatus 330 may be a free-standing apparatus 330, such as a wing of aircraft 332. Additionally or alternatively, and as further illustrated in FIG. 6, apparatus 330 may be supported by an apparatus supporting structure 334, such as a table, a scaffold, and/or a conveyor belt.

Figure 7:
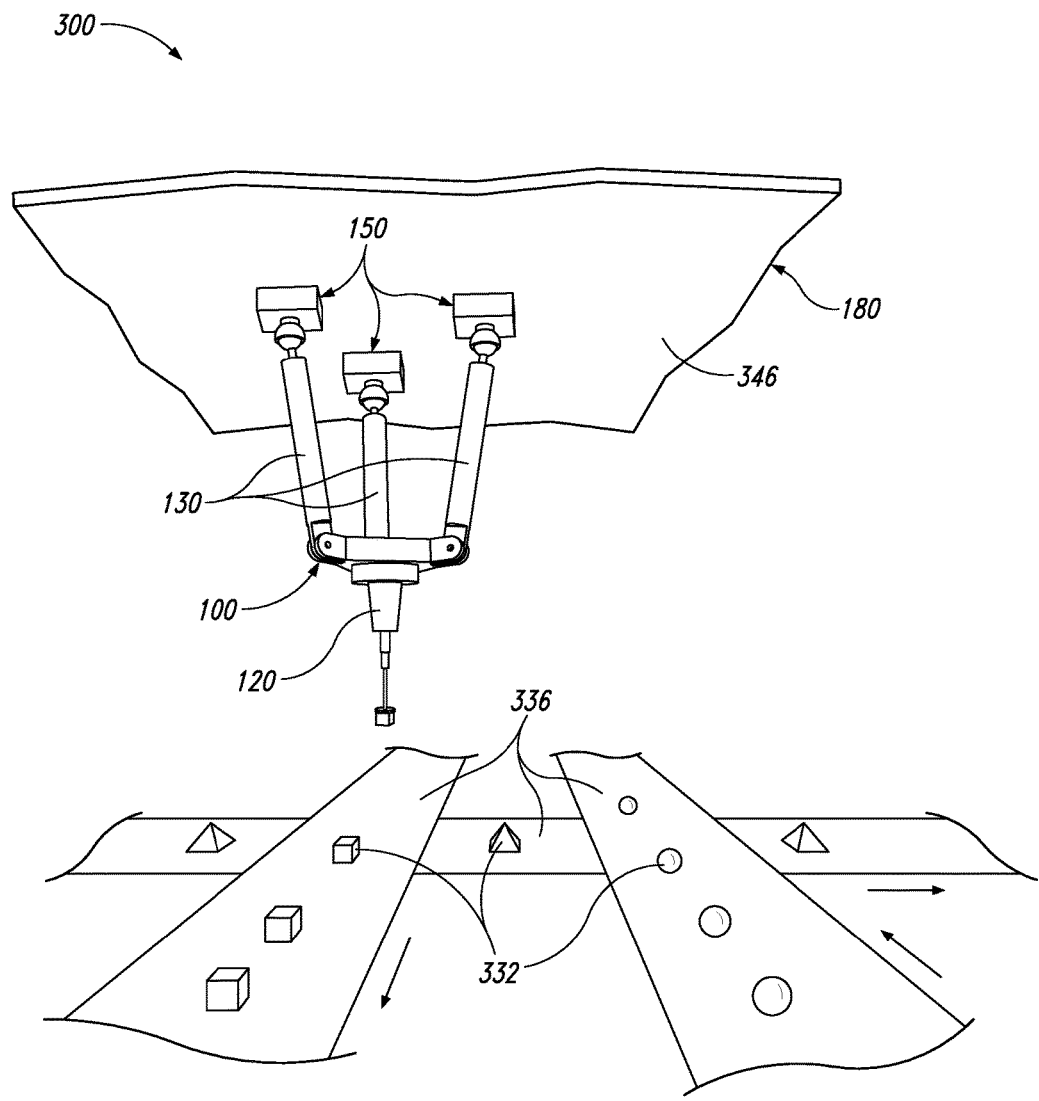
FIG. 7 is a schematic illustration representing a robotic system according to the present disclosure.
Figure 8:
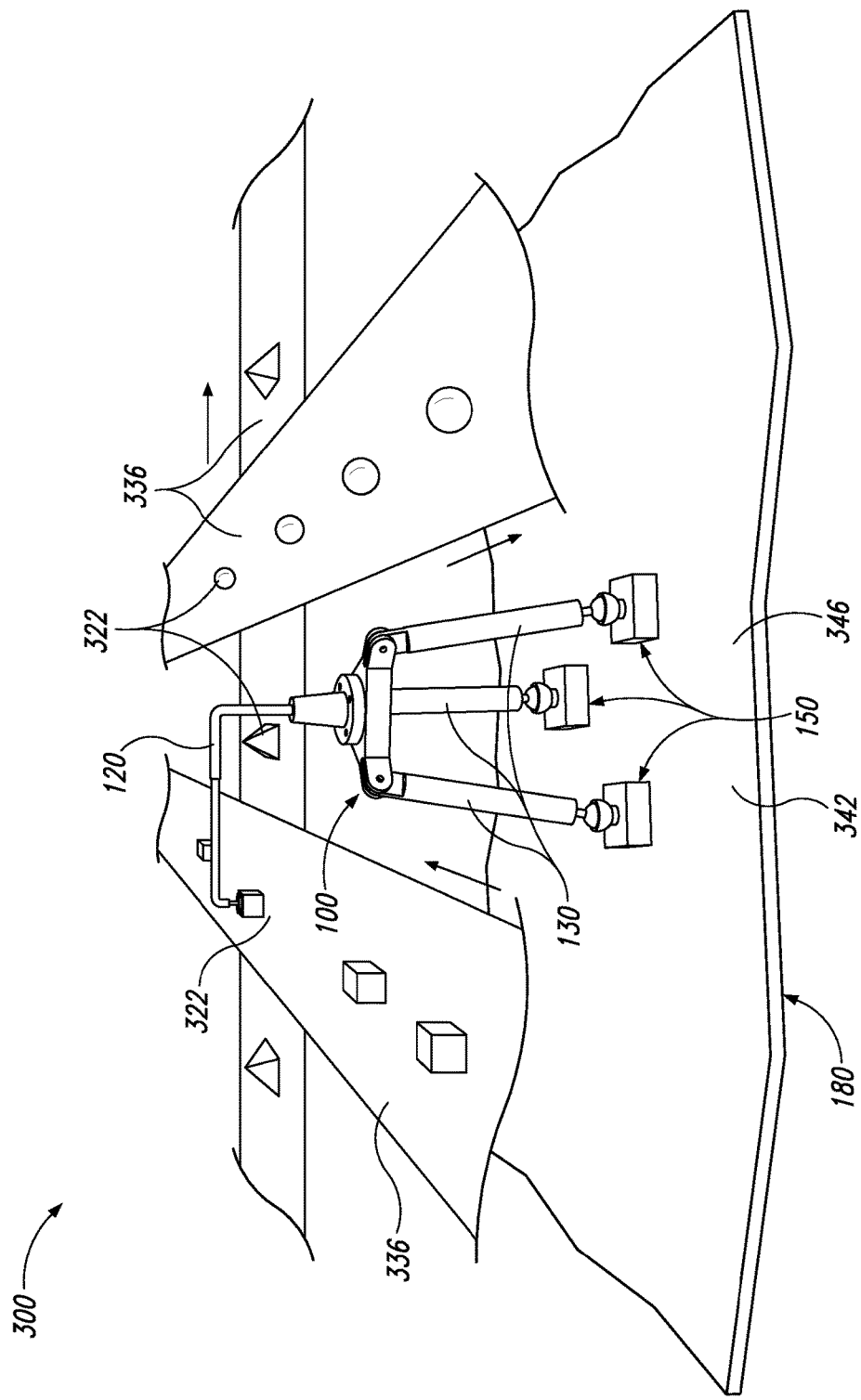
FIG. 8 is a schematic illustration representing a robotic system according to the present disclosure.

With reference to the examples of FIGS. 7 and 8, a robotic system 300 may include one or more conveyors 336 for transporting parts 322. In such systems 300, a robot 100 may have an end effector 120 that is configured to be operatively positioned above the conveyors 336, such as to work on, manipulate, or otherwise engage parts as they travel along the conveyors. In the example of FIG. 7, the robot 100 is positioned vertically beneath the surface 180 with its end effector 120 opposite its legs 130. In such a configuration, the robot 100 may easily move its end effector 120 with six degrees of freedom relative to each of two or more conveyors 336. In the example of FIG. 8, the robot 100 is positioned vertically above the surface 180 with its end effector 120 operatively coupled to its body 110 opposite its legs 130. In such a configuration, the robot 100 may easily move its end effector 120 with six degrees of freedom relative to each of two or more conveyors 336.

Figure 9:
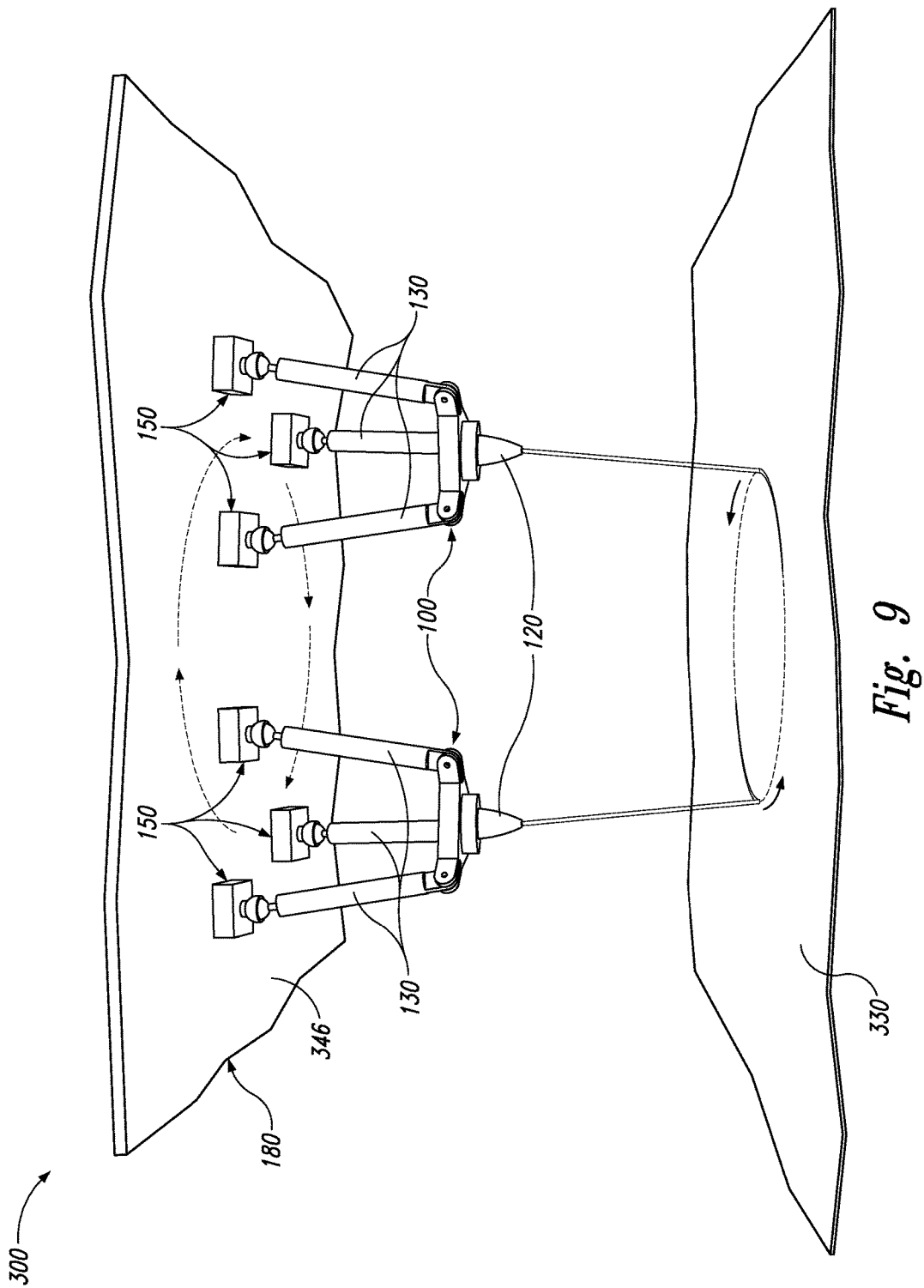
FIG. 9 is a schematic illustration representing a robotic system according to the present disclosure.

Additionally or alternatively, two robots 100 of a plurality of robots 100 of a system 300 may be configured to perform the same, or similar, task, and thus to collectively accomplish a task. As an example, FIG. 9 schematically illustrates two robots 100, each having an end effector 120 configured to cut a work piece 330. In the illustrated example, the robots 100 are operatively coupled to the surface 180, with the surface 180 being positioned vertically above the robots 100 and with the work piece 330 being positioned vertically beneath the robots. Other configurations of robotic systems 300 having two or more robots 100 collectively working together to accomplish a task also are within the scope of the present disclosure.

Figure 11:
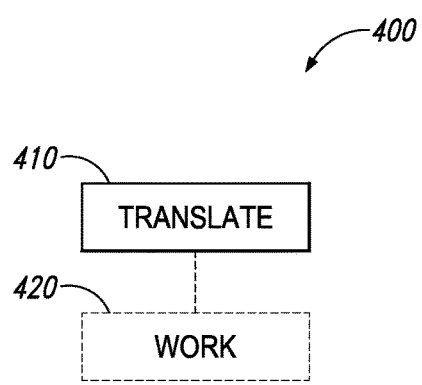
FIG. 11 is a flowchart schematically representing methods of operating robots and robotic systems according to the present disclosure.

FIG. 11 schematically provides a flowchart that represents illustrative, non-exclusive examples of methods according to the present disclosure. In FIG. 11, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 11 are not limiting and other methods and steps are within the scope of the present disclosure, including methods having greater than or fewer than the number of steps illustrated, as understood from the discussions herein.

As seen in FIG. 11, methods 400 of operating a robot 100 includes selectively, independently, and motively translating 410 at least one foot 150 to operatively move a body 110 with six degrees of freedom, and additionally may include working 420 on a work piece 330 with the robot.

Translating 410 may include translating at least one foot 150 and/or all feet 150 of robot 100 with two degrees of translational freedom on a surface 180 and may include translating the at least one foot 150 simultaneously, translating the at least one foot 150 sequentially, and/or a combination thereof. Translating 410 may include translating each foot 150 to a predetermined respective location with respect to at least one other foot 150 and/or the surface 180, and/or may include translating each foot 150 responsive to information collected by a sensor 160. Additionally or alternatively, translating 410 may include translating at least one foot 150 to bring the body 110 to a predetermined location and/or rotational orientation.

Working 420 may include utilizing an end effector 120 to perform an operation on and/or with the work piece 330. For example, working 420 may include assembling, welding, drilling, cutting, removing material from, placing fiber on, gripping, sensing, and/or lifting the work piece 330. Working 420 may include performing an operation relating to assembly and/or manufacture, such as aerospace industrial manufacturing.

Figure 10:
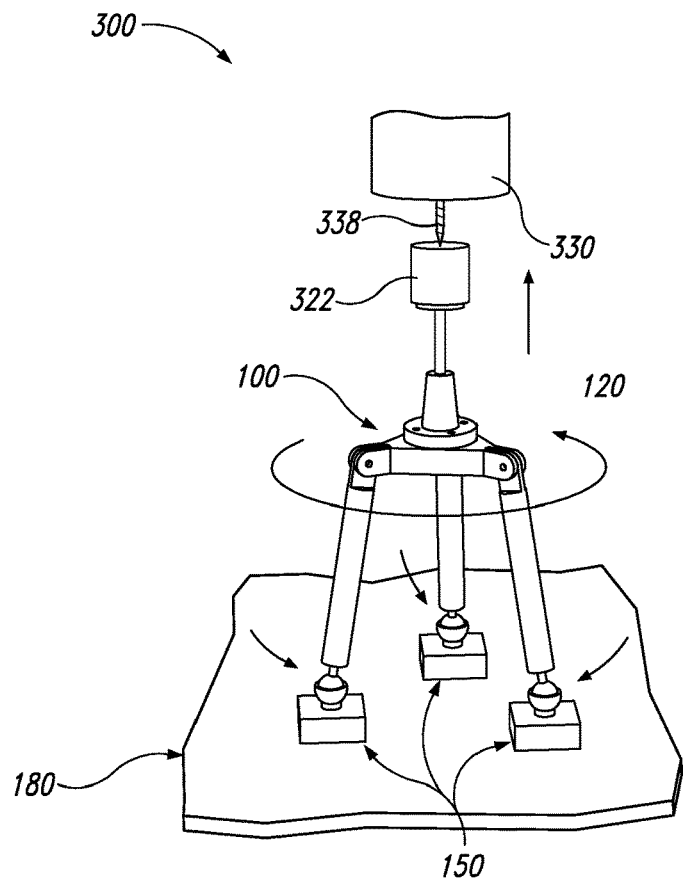
FIG. 10 is a schematic illustration representing a robotic system according to the present disclosure.

Translating 410 may include translating the at least one foot to rotate a part 322 relative to a work piece 330 and translate the part toward the work piece. For example, with reference to the example system 300 of FIG. 10, the translating 410 may result in the part 322 becoming threadingly coupled to the work piece 330, such as with the work piece 330 having a threaded fastener 338. As schematically illustrated in FIG. 10, such a task may be accomplished by coordinating the simultaneous movement of the feet 150 to bring the feet 150 toward each other while also revolving the feet 150 around a point on the surface 180. As a result, the end effector 120 and the part 322 will rotate and translate away from the surface 180 toward the work piece 330.

Methods 400 may include operating a single robot 100, and/or may include operating a robotic system 300 that may include one or more robots 100. For example, translating 410 may include selectively, independently, and motively translating at least one foot 150 of the one or more robots 100 of the robotic system 300 to operatively move the respective bodies 110 with six degrees of freedom. Similarly, working 420 may include working on the part 322 and/or the work piece 330 with the one or more robots 100, and may include assembling, welding, drilling, cutting, removing material from, placing fiber on, gripping, sensing, and/or lifting the part 322 and/or the work piece 330 with the one or more robots 100.

As an illustrative, non-exclusive example, the working 420 may include lifting the part with two or more robots 100 and aligning the part relative to a work piece. In some such examples, the method 400 may further include assembling the part to the work piece. FIG. 5 illustrates an example of a part 322 in the form of a wing and a work piece 330 in the form of a fuselage; however, other examples are within the scope of the present disclosure.

As another illustrative, non-exclusive example, the working 420 may include cutting a work piece, and the translating 410 may include coordinating movement of the two or more robots to collectively cut the work piece, such as discussed herein with reference to FIG. 9.

Illustrative, non-exclusive examples of inventive subject matter according to the present disclosure are described in the following enumerated paragraphs:

A. A robot for moving relative to a surface, the robot comprising:
    a body;
    at least two legs, wherein each leg has a proximal end region and a distal end region, and wherein the proximal end region of each leg is operatively coupled to the body at a respective body joint with one rotational degree of freedom; and
    at least two feet, wherein each foot is operatively coupled to the distal end region of a respective leg of the at least two legs at a respective foot joint comprising two rotational degrees of freedom, and wherein each foot is configured to be selectively, independently, and motively translated relative to the surface with two degrees of translational freedom.

A1. The robot of paragraph A, wherein the body is configured to be operatively coupled to an end effector.

A1.1. The robot of paragraph A1, wherein the body is configured to be operatively coupled to the end effector with the end effector positioned between the at least two legs.

A1.2. The robot of any of paragraphs A1-A1.1, wherein the body is configured to be operatively coupled to the end effector with the end effector positioned opposite the at least two legs relative to the body.

A1.3. The robot of any of paragraphs A1-A1.2, further comprising the end effector operatively coupled to the body.

A1.3.1. The robot of paragraph A1.3, wherein the end effector comprises one or more of a welding tool, a drilling tool, a cutting tool, a material removal tool, a fiber placement tool, a gripping tool, a force-torque sensor, a tool changer, and a lifting tool.

A2. The robot of any of paragraphs A-A1.3.1, wherein each body joint defines a single rotational degree of freedom.

A3. The robot of any of paragraphs A-A2, wherein each body joint consists of a revolute joint.

A4. The robot of any of paragraphs A-A3, wherein the body joints are evenly spaced around a periphery of the body.

A5. The robot of any of paragraphs A-A4, wherein each leg of the at least two legs comprises an elongate leg.

A5.1. The robot of paragraph A5, wherein each leg of the at least two legs has the same length.

A6. The robot of any of paragraphs A-A5.1, wherein each leg of the at least two legs has a fixed length.

A7. The robot of any of paragraphs A-A5, wherein each leg of the at least two legs is configured to be selectively increased and decreased in length.

A8. The robot of any of paragraphs A-A7, wherein each leg of the at least two legs is rigid.

A9. The robot of any of paragraphs A-A8, wherein each leg of the at least two legs is at least substantially linear.

A10. The robot of any of paragraphs A-A8, wherein at least one leg of the at least two legs is non-linear.

A11. The robot of any of paragraphs A-A10, wherein the at least two legs comprise three legs, and wherein the at least two feet comprise three feet.

A12. The robot of any of paragraphs A-A10, wherein the at least two legs consist of three legs, and wherein the at least two feet consist of three feet.

A13. The robot of any of paragraphs A-A12, wherein each foot joint defines exactly three rotational degrees of freedom.

A14. The robot of any of paragraphs A-A13, wherein each foot joint comprises one of a spherical joint, a ball joint, a ball-and-socket joint, or a universal joint.

A15. The robot of any of paragraphs A-A14, wherein each foot of the at least two feet comprises a planar motor.

A16. The robot of any of paragraphs A-A15, wherein each foot of the at least two feet comprises one or more wheels, optionally spherical wheels, optionally motorized wheels.

A17. The robot of any of paragraphs A-A16, wherein each foot of the at least two feet comprises one or more air bearings configured to provide a cushion of air between each foot and the surface.

A18. The robot of any of paragraphs A-A17, wherein each foot of the at least two feet is configured to be selectively and releasably fixed to the surface at a respective location.

A19. The robot of any of paragraphs A-A18, wherein each foot of the at least two feet comprises an automated guided vehicle (AGV).

A20. The robot of any of paragraphs A-A19, further comprising one or more sensors operatively coupled to one or more of the body, the at least two legs, and the at least two feet, wherein the one or more sensors are configured to detect one or more of position in three-dimensional space, orientation in three-dimensional space, and acceleration.

A21. The robot of any of paragraphs A-A20, further comprising a robot controller configured to selectively, independently, and motively translate each foot of the at least two feet relative to the surface.

A21.1. The robot of paragraph A20 when depending from paragraph A20, wherein the robot controller is communicatively coupled to the one or more sensors, and wherein the robot controller is configured to selectively, independently, and motively translate each foot of the at least two feet relative to the surface based at least in part on data received from the one or more sensors.

A22. The use of the robot of any of paragraphs A-A21.1, optionally in a manufacturing environment.

B. A robotic system, comprising:
one or more robots according to any of paragraphs A-A21.1; and
the surface, wherein the one or more robots are positioned for moving along the surface.

B1. The robotic system of paragraph B, wherein the one or more robots comprises two or more robots comprising at least a first robot and a second robot.

B1.1. The robotic system of paragraph B1, wherein the first robot has a first type of end effector operatively coupled to its respective body, wherein the second robot has a second type of end effector operatively coupled to its respective body, and further wherein the first type of end effector is different from the second type of end effector.

B1.2. The robotic system of any of paragraphs B1-B1.1, wherein the second robot is configured to perform a distinct task from the first robot.

B1.3. The robotic system of any of paragraphs B1-B1.2, wherein the second robot is sized differently from the first robot.

B1.4. The robotic system of any of paragraphs B1-B1.3, wherein the first robot has a respective end effector operatively coupled to its respective body between its respective at least two legs, and wherein the second robot has a respective end effector operatively coupled to its respective body opposite its respective at least two legs relative to its respective body.

B1.5. The robotic system of any B1, wherein the first robot and the second robot each have an end effector operatively coupled to its respective body, wherein the end effectors are configured to collectively perform a task, and wherein the first robot and the second robot are positioned relative to each other to work on a work piece to collectively accomplish the task.

B1.5.1. The robotic system of paragraph B1.5, wherein the end effector comprises a cutting tool, and wherein the first robot and the second robot are configured to collectively cut the work piece.

B2. The robotic system of any of paragraphs B-B1.5.1, wherein the one or more robots comprises at least one transporting robot that is configured to selectively acquire and transport parts to proximate an apparatus being assembled.

B2.1. The robotic system of paragraph B2, further comprising an inventory of parts for assembling the apparatus, wherein the surface extends proximate the inventory of parts, and wherein the at least one transporting robot is configured to selectively acquire and transport parts from the inventory of parts to proximate the apparatus being assembled.

B2.2. The robotic system of any of paragraphs B2-B2.1, wherein the one or more robots further comprises at least one installing robot that is configured to selectively receive parts from the at least one transporting robot for operatively installing parts on the apparatus being assembled.

B3. The robotic system of any of paragraphs B-B2.2, wherein the surface comprises one or more horizontal regions.

B4. The robotic system of any of paragraphs B-B3, wherein the surface comprises one or more vertical regions.

B5. The robotic system of any of paragraphs B-B4, wherein the surface comprises one or more planar regions.

B6. The robotic system of any of paragraphs B-B5, wherein the surface comprises one or more curved regions.

B7. The robotic system of any of paragraphs B-B6, wherein the surface comprises one or more operational regions configured for a robot of the one or more robots to be positioned to work on a work piece.

B8. The robotic system of any of paragraphs B-B7, wherein the surface comprises one or more travel regions configured for a/the robot of the one or more robots to travel along without being positioned to work on a/the work piece.

B8.1. The robotic system of paragraph B8 when depending from paragraph B7, wherein the one or more travel regions are configured for the robot of the one or more robots to travel to and from the one or more operational regions.

B8.2. The robotic system of any of paragraphs B8-B8.1, wherein the one or more travel regions are elongate.

B9. The robotic system of any of paragraphs B-B8.2, further comprising one or more conveyors transporting parts;
wherein the one or more robots comprises a first robot that has an end effector operatively coupled to the body of the first robot, and wherein the end effector is configured to be operatively positioned above the one or more conveyors.

B9.1. The robotic system of paragraph B9, wherein the end effector is operatively coupled to body of the first robot between the at least two legs of the first robot, and wherein at least one of the one or more conveyors extends between the at least two legs of the first robot and beneath the body of the first robot.

B9.1.1. The robotic system of paragraph B9.1, wherein the one or more conveyors comprises two or more conveyors, and wherein the end effector is configured to be operatively positioned above each of the two or more conveyors.

B9.2. The robotic system of paragraph B9, wherein the end effector is operatively coupled to the body of the first robot opposite the at least two legs relative to the body of the first robot, wherein the first robot is positioned vertically beneath the surface, and wherein the one or more conveyors are positioned vertically beneath the first robot.

B9.2.1. The robotic system of paragraph B9.2, wherein the one or more conveyors comprises two or more conveyors, and wherein the end effector is configured to be operatively positioned above each of the two or more conveyors.

B10. The robotic system of any of paragraphs B-B9.2.1, wherein the surface is a platen configured for use with planar motors.

B11. The robotic system of any of paragraphs B-B10, wherein the surface comprises one or more air bearings configured to provide a cushion of air between the feet of the one or more robots and the surface.

B12. The robotic system of any of paragraphs B-B11, further comprising a system controller configured to selectively translate the feet of the one or more robots relative to the surface.

B12.1. The robotic system of paragraph B12, wherein the one or more robots comprises at least two robots, and wherein the system controller is configured to coordinate movement of the at least two robots to accomplish a task.

B13. The use of the robotic system of any of paragraphs B-B13.1, optionally in a manufacturing environment.

C. A method of operating the robot of any of paragraphs A-A21.1, the method comprising:
selectively, independently, and motively translating at least one foot of the at least two feet to operatively move the body with six degrees of freedom.

C1. The method of paragraph C, further comprising:
working on a work piece with the robot.

C1.1. The method of paragraph C1, wherein the working comprises one or more of assembling, welding, drilling, cutting, removing material from, placing fiber on, gripping, sensing, and lifting the work piece.

C1.2. The method of any of paragraphs C1-C1.1, wherein the selectively, independently, and motively translating comprises translating the at least one foot to rotate the work piece relative to an object and translate the work piece toward the object.

C1.2.1. The method of paragraph C1.2, wherein the selectively, independently, and motively translating the at least one foot results in the work piece becoming threadingly coupled to the object.

C1.3. The method of any of paragraphs C1-C1.1,
wherein the robot comprises an end effector coupled to the body; and
wherein the working comprises operatively positioning the end effector relative to two or more conveyors.

D. A method of operating the robotic system of any of paragraphs B-B12.1, wherein the one or more robots comprises two or more robots, the method comprising:
selectively, independently, and motively translating at least one foot of each of the two or more robots to operatively move the body of each of the two or more robots with six degrees of freedom.

D1. The method of paragraph D, further comprising:
working on a work piece with the two or more robots.

D1.1. The method of paragraph D1, wherein the working comprises one or more of assembling, welding, drilling, cutting, removing material from, placing fiber on, gripping, sensing, and lifting the work piece.

D1.2. The method of any of paragraphs D1-D1.1, wherein the work piece is a part utilized in assembly of a second work piece, and wherein the working comprises lifting the part with the two or more robots and aligning the part relative to the second work piece.

D1.2.1. The method of paragraph D1.2, wherein the working further comprises assembling the part to the second work piece.

D1.2.2. The method of any of paragraphs D1.2-D1.2.1, wherein the part is a wing of an aircraft and the second work piece is a fuselage of the aircraft.

D1.3. The method of any of paragraphs D1-D1.1, wherein the working comprises cutting the work piece, and wherein the selectively, independently, and motively translating comprises coordinating movement of the two or more robots to collectively cut the work piece.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses, systems, and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein, and such inventive subject matter may find utility in apparatuses, systems, and/or methods that are not expressly disclosed herein.

The invention claimed is:

1. A robotic system, comprising:
   a surface;
   two or more robots comprising at least a first robot and a second robot, wherein each of the first robot and the second robot comprises:
      a body;
      an end effector operatively coupled to the body;
      at least two legs, wherein each leg has a proximal end region and a distal end region, and wherein the proximal end region of each leg is operatively coupled to the body at a respective body joint with one rotational degree of freedom; and
      at least two feet, wherein each foot is operatively coupled to the distal end region of a respective leg at a respective foot joint comprising two rotational degrees of freedom, wherein each foot is configured to be selectively, independently, and motively translated relative to the surface with two degrees of translational freedom, and wherein each foot includes a drive means for selectively, independently, and motively translating the foot relative to the surface; and
   a system controller configured to selectively translate the feet of the two or more robots relative to the surface, wherein the system controller is configured to coordinate movement of the two or more robots to accomplish a task.

2. The robotic system of claim 1, wherein the first robot has a first type of end effector operatively coupled to its respective body, wherein the second robot has a second type of end effector operatively coupled to its respective body, and further wherein the first type of end effector is different from the second type of end effector.

3. The robotic system of claim 1, wherein the second robot is configured to perform a distinct task from the first robot.

4. The robotic system of claim 1, wherein the second robot is sized differently from the first robot.

5. The robotic system of claim 1, wherein the end effector of the first robot is operatively coupled to its respective body between its respective at least two legs, and wherein the end effector of the second robot is operatively coupled to its respective body opposite its respective at least two legs relative to its respective body.

6. The robotic system of claim 1, wherein the end effectors are configured to collectively perform a task, and wherein the first robot and the second robot are positioned relative to each other to work on a work piece to collectively accomplish the task.

7. The robotic system of claim 6, wherein the end effectors comprise a cutting tool, and wherein the first robot and the second robot are configured to collectively cut the work piece.

8. The robotic system of claim 1, further comprising an inventory of parts for assembling an apparatus, wherein the surface extends proximate the inventory of parts; and
   wherein the two or more robots comprises at least one transporting robot that is configured to selectively acquire and transport parts from the inventory of parts to proximate an apparatus being assembled.

9. The robotic system of claim 8, wherein the two or more robots further comprises at least one installing robot that is configured to selectively receive parts from the at least one transporting robot for operatively installing parts on the apparatus being assembled.

10. The robotic system of claim 1,
    wherein the surface comprises one or more operational regions configured for a robot of the two or more robots to be positioned to work on a work piece; and
    wherein the surface comprises one or more travel regions configured for a robot of the two or more robots to travel along to and from the one or more operational regions without being positioned to work on the work piece.

11. A method of operating a robotic system, the method comprising:
    providing a robotic system, the robotic system comprising:
       a surface;
       two or more robots comprising at least a first robot and a second robot, wherein each of the first robot and the second robot comprises:
          a body;
          an end effector operatively coupled to the body;
          at least two legs, wherein each leg has a proximal end region and a distal end region, and wherein the proximal end region of each leg is operatively coupled to the body at a respective body joint with one rotational degree of freedom; and
          at least two feet, wherein each foot is operatively coupled to the distal end region of a respective leg at a respective foot joint comprising two rotational degrees of freedom, wherein each foot is configured to be selectively, independently, and motively translated relative to the surface with two degrees of translational freedom, and wherein each foot includes a drive means for selectively, independently, and motively translating the foot relative to the surface; and
       a system controller configured to selectively translate the feet of the two or more robots relative to the surface, wherein the system controller is configured to coordinate movement of the two or more robots to accomplish a task;
    selectively, independently, and motively translating at least one foot of each of the two or more robots to operatively move the body of each of the two or more robots with six degrees of freedom; and
    working on a work piece with the two or more robots.

12. The method of claim 11, wherein the work piece is a part utilized in assembly of a second work piece, and wherein the working comprises lifting the part with the two or more robots and aligning the part relative to the second work piece, wherein the part is a wing of an aircraft and the second work piece is a fuselage of the aircraft.

13. The method of claim 11, wherein the working comprises cutting the work piece, and wherein the selectively, independently, and motively translating comprises coordinating movement of the two or more robots to collectively cut the work piece.

14. A robotic system, comprising:
a surface;
one or more conveyors for transporting parts relative to the surface;
a robot, wherein the robot comprises:
  a body;
  an end effector operatively coupled to the body, wherein the end effector is configured to be operatively positioned above the one or more conveyors;
  at least two legs, wherein each leg has a proximal end region and a distal end region, and wherein the proximal end region of each leg is operatively coupled to the body at a respective body joint with one rotational degree of freedom; and
  at least two feet, wherein each foot is operatively coupled to the distal end region of a respective leg at a respective foot joint comprising two rotational degrees of freedom, wherein each foot is configured to be selectively, independently, and motively translated relative to the surface with two degrees of translational freedom, and wherein each foot includes a drive means for selectively, independently, and motively translating the foot relative to the surface; and
a system controller configured to selectively translate the feet of the robot relative to the surface, wherein the system controller is configured to coordinate movement of the robot to accomplish a task.

15. The robotic system of claim 14, wherein the end effector is operatively coupled to the body of the robot between the at least two legs of the robot, and wherein at least one of the one or more conveyors extends between the at least two legs of the robot and beneath the body of the robot.

16. The robotic system of claim 15, wherein the one or more conveyors comprises two or more conveyors, and wherein the end effector is configured to be operatively positioned above the two or more conveyors.

17. The robotic system of claim 14, wherein the end effector is operatively coupled to the body of the robot opposite the at least two legs relative to the body, wherein the robot is positioned vertically beneath the surface, and wherein the one or more conveyors are positioned vertically beneath the robot.

18. The robotic system of claim 5, further comprising:
one or more conveyors for transporting parts;
wherein at least one of the one or more conveyors extends between the at least two legs of the first robot and beneath the body of the first robot.

* * * * *